United States Patent [19]

Kanada

[11] Patent Number: 4,720,837
[45] Date of Patent: Jan. 19, 1988

[54] LADLE FURNACE

[75] Inventor: Kenji Kanada, Aichi, Japan

[73] Assignee: Daidotokushuko Kabushikikaisha, Japan

[21] Appl. No.: 828,816

[22] Filed: Feb. 12, 1986

[30] Foreign Application Priority Data

Feb. 12, 1985 [JP] Japan .................................. 60-25066

[51] Int. Cl.$^4$ .............................................. C21C 5/38
[52] U.S. Cl. ....................................... 373/9; 266/158; 373/73
[58] Field of Search ....................... 266/158, 159, 208; 373/8, 9, 73, 74

[56] References Cited

U.S. PATENT DOCUMENTS 4,460,164 7/1984 Tivelius ............................... 266/158

OTHER PUBLICATIONS

Japanese Industrial Furnace Handbook, published by Tokyo Technocenter Co., Ltd., Jul. 20, 1978, p. 156.

Primary Examiner—L. Dewayne Rutledge
Assistant Examiner—Robert L. McDowell
Attorney, Agent, or Firm—William A. Drucker

[57] ABSTRACT

The specification discloses a ladle furnace apparatus for refining molten steel tapped from a steelmaking furnace therein. There are introduced molten steel and a slag making material into the ladle. The outer and inner lids of the ladle furnace are put on the respective receiving surfaces of the ladle to close the opening thereof. In the interior of the ladle, the slag making material is slagged by arc heating thereby to refine molten steel introduced therein by means of the slag. During the refining process, the suction of gas is carried out from a space formed between the outer lid and the inner lid. Therefore, a dust containing gas generated by reaction of the molten steel and slag enters the space between the outer lid and the inner lid passing through a gap formed between the inner lid and the ladle or electrode holes disposed in the inner lid to be sucked therefrom. Even if the open air enters the apparatus through a gap between the outer lid and the ladle, the open air does not flow inside of the inner lid. Therefore, it is possible to prevent the temperature of slag from being lowered due to the open air. In addition, it is also possible to prevent the refining efficiency of slag on the molten steel from being lowered. Consequently, refining on the molten steel can efficiently be performed.

4 Claims, 13 Drawing Figures

LADLE FURNACE

BACKGROUND OF THE INVENTION

1. Field of the Invention

This invention relates to a ladle furnace for refining molten steel.

2. Description of the Prior Art

Figures 10, 11:
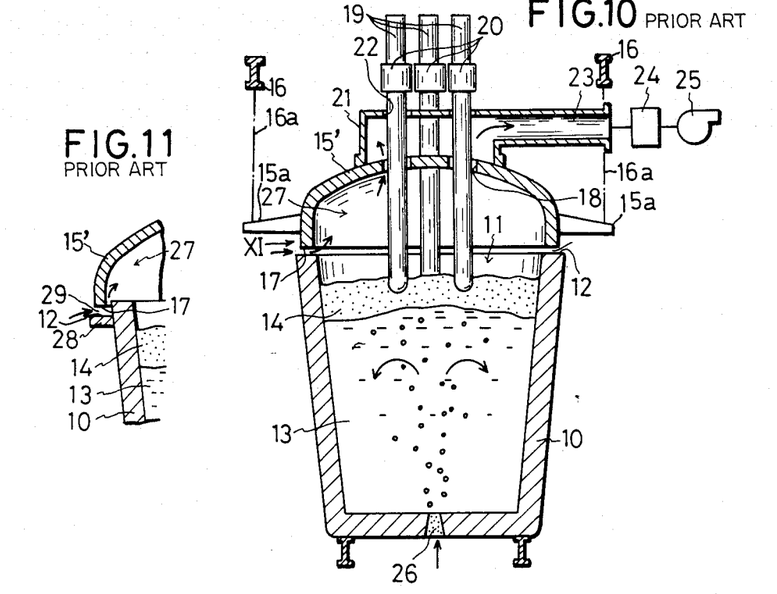
FIG. 10 is a vertical longitudinal sectional view of the conventional ladle furnace.
FIG. 11 is a view showing a modification of the construction of the portion represented by a reference numeral XI in FIG. 10.

As a ladle furnace of this type, for example, a ladle furnace apparatus as shown in FIG. 10 has well been known. In the aforesaid apparatus of FIG. 10, a ladle 10 is provided with an opening 11 at the upper portion thereof and an annular receiving surface 12 for a lid 15' at the periphery thereof. The upper end portion of the ladle 10 may also be formed as shown in FIG. 11. Namely, the ladle 10 is provided with an annular flange 28 at the outer peripheral wall of an upper portion thereof and the upper surface of this flange 28 may construct the lid receiving surface 12. The opening 11 of the ladle 10 is closed by the lid 15'. The lid 15' is suspended from a supporting beam 16 through a chain or wire 16a and an arm 15a fixed to the lid 15'. The supporting beam 16 is subjected to the rising and lowering movement and the horizontal movement by a not illustrated operating means. Therefore, the lid 15' is put on the ladle 10 by operation of the operating means in such a manner an annular lower end surface 17 thereof is mounted on the lid receiving surface 12 of the ladle 10. The lid 15' is provided with electrode holes 18 and through which, electrodes 19 for arc heating extend into the ladle 10. The electrodes 19 are supported by supporting arms 20, respectively. The supporting arms 20 are also subjected to the rising and lowering movement and the horizontal movement by another operating means different from the aforesaid operating means. On the lid 15', there is provided a hood 21 for enveloping the aforesaid electrode holes 18 and a duct 23 for suction connected to the hood 21 is further connected to a blower 25 via a filter 24.

According to the conventional apparatus thus constructed, the lid 15' is taken off and in this state, molten steel tapped from a steelmaking furnace and a slag making material are introduced into the ladle 10 and thereafter, the opening of the ladle 10 is closed by the lid 15'. Then, an electric energy is supplied to the electrodes 19 to generate arc between the electrodes 19 and the molten steel. By this arc, the aforesaid slag making material is slagged to be formed into slag 14 and refining is carried out on the aforesaid molten steel by utilizing the slag 14. In this case, there is injected a reducing atmosphere gas, for example, an inert gas such as argon or the like, into the ladle 10 from an injection port 26 provided at the bottom wall of the ladle 10. The injection port 26, for example, is composed of a porous plug so that it allows injection of the reducing atmosphere gas into the ladle 10. This reducing atmosphere gas brings bubbling action on the molten steel 13 and the slag 14 and stirs them thereby to promote the refining efficiency of slag on the molten steel. In addition, since a space 27 formed above the slag 14 and the molten steel 13 is always filled with the aforesaid reducing gas, there can be prevented lowering of the refining efficiency of slag 14 caused by the oxidation thereof. As another means for injecting the aforesaid reducing atmosphere gas into the ladle 10, the injection port may be provided at the side wall of the ladle 10 or a lance passing through the lid 15' may be inserted into the molten steel 13.

During the aforesaid refining process, a dust containing gas is generated from the molten steel 13 and the slag 14 in the direction of the upper space 27 by the reaction thereof. If the dust containing gas leaks out of the ladle furnace, this results in deterioration of the working environment around the furnace. To prevent this deterioration of the working environment, the interior of the hood 21 is made to be in negative pressure by means of a blower 25. As a result, the aforesaid dust containing gas is sucked into the hood 21 together with the reducing atmosphere gas from the upper space 27 passing through the electrode holes 18. And these gases and dusts pass through the filter 24 so that the dusts are removed therefrom and the resulting gases are emitted to the atmosphere passing through the blower 25.

After completion of the aforesaid refining process, the electrodes 19 and the lid 15' are taken out of the ladle 10. And subsequently, the ladle 10 is inclined to carry out removal of the slag 14 and tap of the molten steel 13. On the other hand, the molten steel may be tapped through a discharge port provided at the bottom wall of the ladle 10, without inclination of the ladle 10.

The aforesaid operations such as to introduce the molten steel and slag into the ladle and to carry out slag refining on the molten steel in the ladle with the atmosphere within the ladle being kept reducing, for example, have been known from the Japanese Industrial Furnace Handbook, on the right column of page 156, lines 9 to 24 (published on July 20, 1978 by Tokyo Technocenter Co., Ltd. in Japan).

A series of processes, comprising the steps of introducing the molten steel and slag into the ladle, refining the molten steel therein and tapping the molten steel from the ladle, is repeatedly performed. Therefore, the slag 14 and the molten steel 13 adhere locally to the lid receiving surface 12 of the ladle 10. In addition, on the lid receiving surface 12, there occurs gradually heat-caused deformation. As a result, if the lid 15' is put on the ladle 10 so as to mount the annular lower end surface 17 of the lid 15' on the lid receiving surface 12 of the ladle 10, it is encountered that a gap 29 of about 30 to 70 mm is locally formed therebetween. If the refining process as described above is performed in such a state, the open air flows into the upper space 27 passing through the aforesaid gap 29, because the upper space 27 is in negative pressure due to the suction of gases by the blower 25. As a result, there are encountered the following disadvantages.

Primarily, the temperature of slag 14 is lowered due to the air flowing into the space 27. Therefore, in order to prevent lowering of the temperature of the aforesaid slag, an electric energy to be supplied to the electrodes 19 has to be increased to increase arc heating. Consequently, electric energy consumption for this purpose is also increased.

Secondarily, the refining efficiency of the slag 14 is remarkably lowered due to oxygen contained in the air entered into the space 27. If the refining efficiency of the slag 14 is lowered, the time required for refining is extended so that damage of the inner wall of the ladle 10 is increased and consequently, a large cost must be expended for repairing the ladle 10. In addition, if the aforesaid refining time is extended, the electric energy to be supplied to the electrodes is much required for preventing lowering of the temperature of slag and molten steel in proportion to the extended time period, resulting in increment of the amount of electric energy required for refining.

Furthermore, in the conventional apparatus described above, the molten steel 13 occasionally reacts with the slag 14 with violence and a large amount of gas is generated at this time. In this case, the gas thus generated is spouted out into the hood 21 through the electrode holes 18 of the lid 15'. And in some cases, it is also encountered that the gas generated leaks out of the apparatus passing through electrode holes 22 of the hood 21. In order to prevent the aforesaid disadvantages, the amount of suction from the hood 21 has to be remarkably increased as much as to exceed the large amount of gas temporally generated as described above. However, if the amount of suck is increased in this manner, the amount of air flowing into the upper space 27 is also increased. In addition, a large capacity of blower must be employed as the blower 25 for sucking the gas so that the operation cost thereof is also increased.

Figure 13:
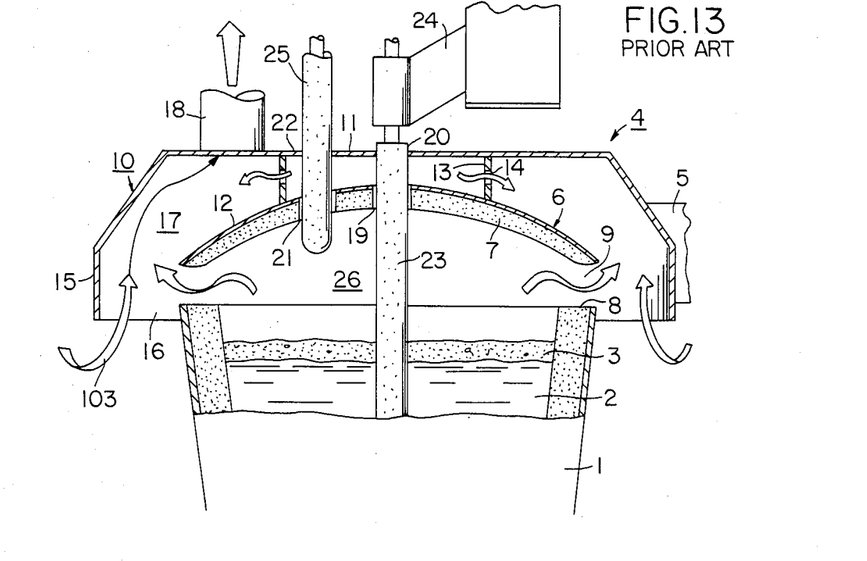

As an art aiming at solving the above mentioned problems, there is an art disclosed, for example, in U.S. Pat. No. 4,460,164. According to this art, a screen 10 which enclosed the upper portion and the side peripheral surface of the lid 15' and is open at the lower end thereof is disposed against the lid 15' with a space therebetween. The screen is provided with an exhaust pipe to suck a large volume of air in the above mentioned space. With the arrangement of this kind, an air flow (see 103 in FIG. 13) in the direction of the exhaust pipe 18 is produced around the gap 9 by sucking through the exhaust pipe 18 a large amount of air from the space between the lid and the screen. As a result of this, the gas leaking out through the space 9 between the ladle 1 and the lid 6 follows the flow 103 of the large amount of air and flows in the direction of the exhaust pipe 18. Thus the gas leaking out from nearby shops can be prevented from damaging the environment. At the same time, as long as the external air is flowing in the direction of the exhaust pipe 18, it is possible to prevent the air from flowing from the gap between the ladle and the lid into the ladle and from lowering the temperature in the ladle or from decreasing smelting ability.

SUMMARY OF THE INVENTION

A first object of the present invention is to provide a ladle furnace wherein molten steel and slag are introduced into a ladle and refining is carried out on the molten steel with high efficiency.

A second object of the present invention is to provide a ladle furnace which can prevent a dust containing gas generated from the molten steel and slag from being spouted out of the furnace by sucking gases by means of the blower during the aforesaid refining process.

A third object of the present invention is to provide a ladle furnace which is designed in such a manner that if the open air enters the furnace through a gap formed between the ladle and the outer lid, the air entered therein is not made to contact with the slag in the ladle, in case that refining is carried out while sucking gases by means of the blower.

Namely, the ladle furnace of the present invention includes:

(a) a ladle for accepting molten steel and slag therein, which is provided with an opening at the upper end thereof and an annular outer lid receiving surface at the periphery of said opening;

(b) an outer lid for closing the opening of the ladle, which is provided with an annular lower end surface at the periphery thereof to be mounted on the aforesaid outer lid receiving surface of the ladle;

(c) electrode extending through electrode holes provided in the outer lid into the interior of the ladle to generate arc between the molten steel accepted into the ladle and the electrodes to heat the molten steel and slag; and (d) supplying means for supplying a reducing atmosphere gas into the space in the ladle formed above the slag and molten steel accepted thereinto.

Besides, the ladle furnace of this invention further includes:

(e) an inner lid provided at the inside of the outer lid with a predetermined interval so as to form a space therebetween. Therefore, the ladle is further provided with an annular receiving surface for the inner lid at the inside of the outer lid receiving surface. The inner lid is provided with an annular lower end surface at the periphery thereof to be mounted on the inner lid receiving surface of the ladle and also electrode holes at the central area thereof, through which the electrodes extend into the interior of the ladle. The outer lid is further provided with a suction port to suck gases entered into the space formed between the outer lid and the inner lid.

Accordingly, if the suction of gases is performed by means of a blower through the aforesaid suction port communicating with the space between the outer lid and the inner lid in the state wherein the reducing atmosphere gas is injected into the space formed above the slag and molten steel, the pressure in the space formed between the outer lid and the inner lid becomes lower than that in the space formed above the slag. Therefore, even if the open air is brought in the furnace through the gap formed between the outer lid receiving surface of the ladle and the annular lower end surface at the periphery of the outer lid, the air enters only the space between the outer lid and the inner lid. (No open air enters the space above the slag having a higher pressure than that of the space between the outer lid and the inner lid.) As a result, the space above the slag is filled with the reducing atmosphere gas supplied into the ladle by the reducing atmosphere gas supplying means and the space is kept in the reducing atmosphere.

Consequently, since lowering of the slag temperature due to entrance of the open air does not occur, the electric energy to be supplied to the electrodes for the purpose of heating the slag is enough to be small. In addition, it is possible to obtain a satisfactory effect in refining on the molten steel in a short period of time, because there is no lowering in refining efficiency of the slag caused by the entrance of air. As a result, it is possible to carry out refining on the molten steel with a minimal electric energy consumption. Moreover, since the time required for refining is short, damage at the inner wall of the ladle is small and the cost required for repairing the ladle is also minimal.

A further object of the present invention is to provide a ladle furnace designed in such a manner a dust containing gas generated by reaction of the molten steel and slag can efficiently be sucked with a small amount of suction, in carrying out refining.

DETAILED DESCRIPTION OF THE PREFERRED EMBODIMENT

Hereinafter, a preferred embodiment of the present invention will be explained with reference to FIGS. 1 to 9. In FIGS. 1 to 9, the same reference numerals as those of FIGS. 10 and 11 (illustrating the conventional apparatus) designate the same parts as those of the conventional apparatus, respectively. And therefore, since these parts have the constructions equivalent to those of the conventional apparatus in function, the detailed explanations thereof will be omitted.

Figure 3:
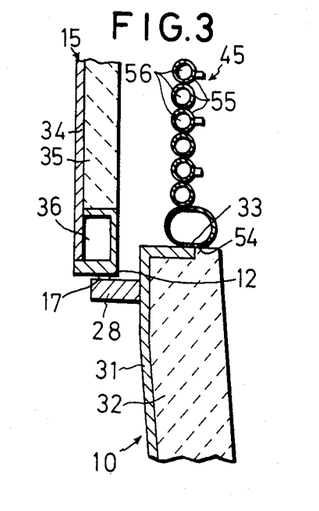
FIG. 3 is a view showing the detailed construction of the portion represented by a reference numeral III in FIG. 1.
Figure 4:
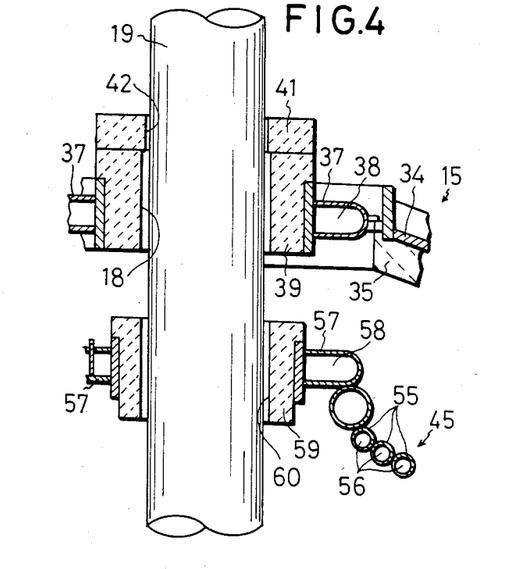
FIG. 4 is a view showing the detailed construction of the portion represented by a reference numeral IV in FIG. 1.
Figure 5:
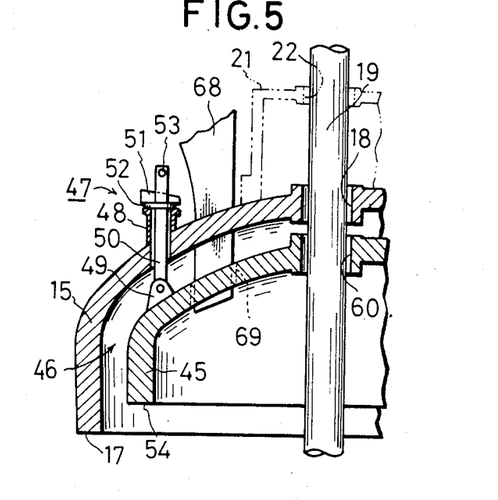
FIG. 5 is an enlarged view of the portion represented by a reference numeral V in FIG. 1.

Referring first to FIGS. 1 to 5, a ladle 10 comprises a shell 31 and a refractory lining 32 disposed at the inner wall of the shell 31, as illustrated in FIG. 3. At the upper end surface of the ladle 10, there is formed an annular receiving surface 33 for an inner lid 45. The inner lid receiving surface 33 is positioned to the inside of the outer lid receiving surface 12. The ladle furnace according to the present invention includes an outer lid 15 as a lid having the construction equivalent to the conventional lid 15'. The outer lid 15 comprises a central area and an annular peripheral area thereof. The annular peripheral area in the outer lid 15 is composed of a shell 34 and a refractory lining 35 disposed at the inner wall of the shell 34, as illustrated in FIG. 3. The outer lid 15 is also provided with a water circulation passage 36 at the outer periphery thereof to be cooled by a coolant such as water supplied thereinto. The central area in the outer lid 15 is composed of a jacket 37 made of a metal and the interior thereof is constructed as another water circulation passage 38 for a coolant such as water, as shown in FIG. 4. To the jacket 37, there are installed sleeves 39 made of a refractory material having an insulating property and each of electrodes 19 is inserted into the sleeve 39 so as to extend therethrough into the ladle. To the electrode 19, there is fitted a choke plate 41 having a smaller hole 42 than the electrode hole 18 to choke the electrode hole. The choke plate 41 is mounted on the sleeve 29 slidably in the transverse direction thereof so that it can be transversely moved together with the electrode 19 when the electrode 19 is moved transversely. By disposing the choke plate 41 in this manner, it is possible to extremely reduce the amount of gases leaking out of the outer lid 15 passing through the electrode holes 18.

Inside of the outer lid 15, there is further provided an inner lid 45 with a predetermined interval space 46 therebetween. The inner lid 45 is connected to the outer lid by means of hanging means 47 at three portions thereof. The hanging means 47 is constructed as usually illustrated in FIG. 5. Namely, at the outer lid 15, there is attached a cylindrical supporting member 48. Whereas, at the inner lid 45, there is attached a hanging lug 49. And a rod 50, which is connected to the lug 49 at the lower end thereof by a pin, is inserted into the cylindrical supporting member 48 so as to be movable vertically thereinto. At an upper portion of the rod 50, there is provided a cotter hole and a cotter 51 is inserted into the cotter hole in a detachable manner so that the cotter 51 prevents the rod 50 from being deviated from the supporting member 48 downwards. Between the cotter 51 and the supporting member 48, there is interposed a washer 52 and at the upper end of the rod 50, there is attached a pin 53. The inner lid 45 connected to the outer lid 15 by means of the hanging means 47 is capable of the vertical movement in relation to the outer lid 15 in the extent that the rod can vertically move into to the supporting member 48. The relation of the annular lower end surface 17 of the outer lid 15 and the annular lower end surface 54 of the inner lid 45 in their heights are as follows. Namely, when the outer lid 15 and the inner lid 45 are lowered, the annular lower end surface 54 of the inner lid 45 is first mounted on the inner lid receiving surface 33 of the ladle 10. Then, the annular lower end surface 17 of the outer lid 15 is mounted on the outer lid receiving surface 12 of the ladle 10. More particularly, the outer lid receiving surface 12 of the ladle 10 is positioned so as to mount the lower end surface 17 of the outer lid 15 thereon at about the middle of the extent that the inner lid 45 is capable of the vertical movement thereof in relation to the outer lid 15. The inner lid 45 comprises a central area and an annular peripheral area thereof in the same manner as the outer lid 15. The annular peripheral area of the inner lid 45 is formed of a plurality of pipes 55 connected to one another by means of welding. The interior of each pipe 55 is constructed as a water circulation passage 56 for circulating a coolant such as water. The central area of the inner lid 45 is constructed in the same manner as the outer lid 15, and more particularly, it is composed of a jacket 57 having a water circulation passage 58, sleeves 59 made of an insulating refractory material and so on. A reference numeral 60 designates electrode holes of the inner lid 45.

Figure 1:
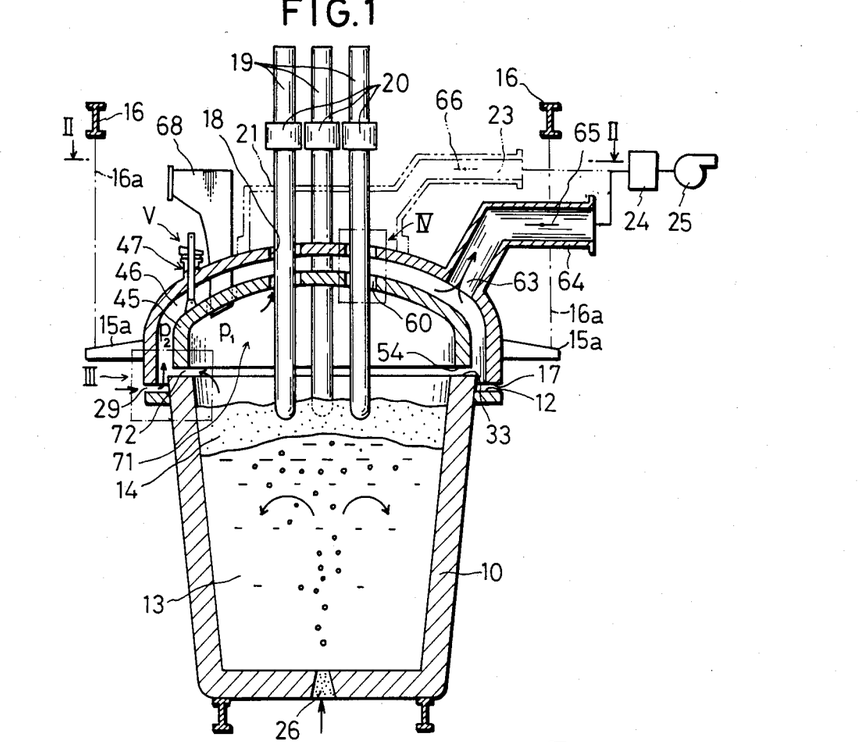
FIG. 1 is a vertical longitudinal sectional view of a ladle furnace of an embodiment according to the present invention.
Figure 2:
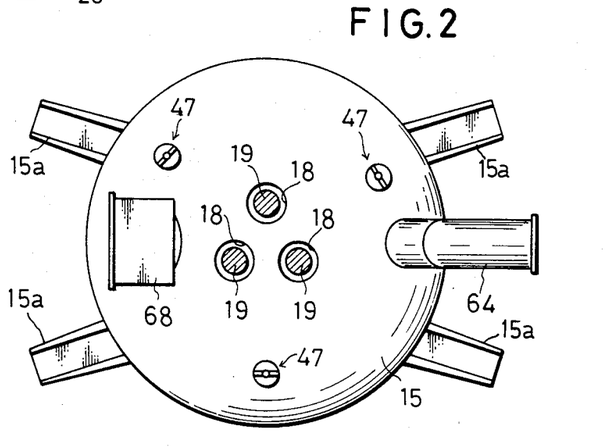
FIG. 2 is a sectional view taken along the line II—II of FIG. 1.

At the outer lid 15, there is formed a suction port 63 for sucking gases entered in the space 46 and it is connected to the filter 24 via a duct 64. The duct 64 is provided with a damper 65 therein for adjusting the amount of suction.

The outer lid 15 is further provided with a shoot 68 for introducing an additive for alloy or a supplementary slag making material. The lower portion of the shoot 68 penetrates to the space 71 formed just below the inner lid 45 through an aperture 69 of the inner lid 45.

According to the aforesaid ladle furnace apparatus thus constructed, the molten steel 13 is first introduced into the ladle 10 and then the slag making material is introduced thereinto. And thereafter, the inner lid 45 and the outer lid 15 are put on the ladle 10 so as to close the opening thereof. In this case, since the inner lid 45 is vertically movable in relation to the outer lid 15 as described above, the respective annular lower end surfaces 17 and 54 of the outer and inner lids 15 and 45 can be mounted on the outer and inner lid receiving surfaces 12 and 33, respectively, to close the opening of the ladle 10. In the closed situation, a submerged arc is formed between the electrodes 19 and molten steel 13 and a reducing atmosphere gas is injected from an injection port 26 disposed at the bottom of the ladle 10. And, gases within the space 46 are sucked from the suction port 63 by the blower 25 via the duct 64 and the filter 24. As a result, refining is carried out on the molten steel 13 in the same manner as that of the conventional apparatus.

During the refining process, a pressure P1 within the space 71 formed between the slag 14 and the inner lid 45 becomes somewhat higher than the atmospheric pressure (for example, 1 to 10 mmAq.) by injecting the reducing atmosphere gas into the ladle 10. Whereas, a pressure P2 within the space 46 becomes somewhat lower than each of the atmospheric pressure and the aforesaid pressure P1. Therefore, gases and dusts in the space 71 (such as reducing atmosphere gas, gases and dusts generated by reaction of the molten steel 13 and slag 14) enter the space 46 passing through the electrode holes 60 of the inner lid 45 and they are sucked into the duct 64 through the suction port 63. In this case, if the slag and molten steel adhere to the inner lid receiving surface 33 or a heat-caused deformation occurs on the receiving surface 33, there is formed a gap 72 between the receiving surface 33 of the ladle 10 and the annular lower end surface 54 of the inner lid 45. In this case, the gases and dusts in the space 71 can enter the space 46 through the gap 72. Further, although the open air enters also the space 46 passing through the electrode holes 18, the air can be sucked into the duct 64 together with the aforesaid gases and dusts entered into the space 46. In addition, if there is formed another gap 29 between the outer lid receiving surface 12 of the ladle 10 and the annular lower end surface 17 of the outer lid 15, the open air also enters the space 46 through the gap 29. However, the air thus entered is also sucked into the duct 64 without entering into the space 71 above the slag, because the pressure P1 within the space 71 is higher than the pressure P2 within the space 46. Therefore, there is encountered no lowering of the slag temperature and the space 71 is always filled with the reducing atmosphere gas so as to be kept reducing. As a result, the refining efficiency of slag 14 on the molten steel 13 can be maintained satisfactory and consequently, refining can be carried out with high performance. Further, in case where the molten steel contains deoxidation elements (such as aluminum and the like) or active elements (such as titanium and the like), the fluctuation of amount of these elements and the loss thereof, which are caused by the oxidation thereof by the entrance of the open air, can be also prevented. After completion of the aforesaid refining process, the outer lid 15, the inner lid 45 and the electrodes 19 are taken out of the ladle 10 and then the slag 14 is removed from the ladle 10 and the resulting molten steel is also tapped therefrom.

During the aforesaid refining process, occasionally, a large amount of gas (a dust containing gas) is temporally generated due to reaction of the molten steel 13 and the slag 14. The dust containing gas is spouted out into the space 46 passing through the electrode holes 60 and the gap 72. And if the spouting amount thereof is larger than the amount of suction from the suction port 63, the aforesaid gas spouted into the space 46 is momentarily further spouted out of the outer lid 15 passing through the electrode holes 18 thereof. (In this case, since the space 46 is in a high temperature, ascending current is generated therein and therefore, the aforesaid dust containing gas is rarely spouted out of the furnace passing through the gap 29.) If it is undesirable to spout out the dust containing gas through the electrode holes 18, a hood 21 may be provided on the electrode holes of the outer lid 15 in the same manner as the conventional apparatus. A duct 23 communicating with this hood 21 is equipped with a damper 66 therein and both the space 46 and the internal space of the hood 21 are subjected to the suction by the blower 25. Thus, the hood 21 can prevent the dust containing gas having leaked therein through the holes 18 from being spouted out of the furnace and scattered in the environment thereof. The dust containing gas, rapidly generated from the molten steel 13 or slag 14 in the space 71, is decreased in its force in the course of passing through the electrode holes 60 of the inner lid 45 and the force thereof is further decreased in the course of passing through the electrode holes 18 of the outer lid 15. Therefore, the dust containing gas entered into the hood 21 can very easily be sucked by only a small amount of suction.

The amount of suction from the suction port 63 is preferable to be slightly larger than the sum of the average amount of gas generated by reaction of the molten steel 13 and slag 14 and of the injection amount of reducing atmosphere gas from the injection port 26. Whereas, the amount of suction from the hood 21 is enough to be able to suck the gas the force of which is decreased in the two courses as described above. Accordingly, the total amount of suction required for the ladle furnace of this embodiment is enough to be much smaller than that of the conventional furnace shown in FIG. 10. As a result, a small capacity of blower can be employed as the blower 25 and the operating cost thereof can also be reduced.

In this connection, the amounts of gases sucked from the suction port 63 and the hood 21 are regulated by means of the dampers 65 and 66, respectively, and more particularly, by adjusting the opening degree thereof. In this connection, usually, it is preferable that the amount of gases sucked from the suction port 63 is larger than the amount of gases sucked from the hood 21. According to the experiment conducted by the inventor, favorable results have been obtained in case where the ratio of the former and the latter is in the range of about 7:3 to 8:2.

Next, as an experimental example of this invention, slag refining was carried out employing each of the ladle furnaces of FIG. 1 and FIG. 10, while sucking the gas generated in each furnace. In the furnace of FIG. 1, the ratio of the respective amounts of suction from the port 63 and hood 21 was 7:3. And then, the composition of the gas generated in each of the spaces 71, 27 above the slag was measured in each furnace. The respective results are shown in Table 1.

TABLE 1

| Component | Furnace of the Embodiment of the Invention (FIG. 1) | Conventional Furnace (FIG. 10) |
|---|---|---|
| CO (%) | 15-30 | 5-20 |
| $CO_2$ (%) | less than 5 | 10-40 |
| $N_2$ (%) | less than 30 | 40-70 |
| Ar (%) | 50-60 | less than 10 |
| $O_2$ (%) | less than 1 | less than 1 |
| Ratio in the amounts of | 1 | 9 |

TABLE 1-continued

| | Furnace of the Embodiment of the Invention (FIG. 1) | Conventional Furnace (FIG. 10) |
|---|---|---|
| air entered into the respective furnace | | |

Firstly, it is known from Table 1 that the percentage of argon (Ar) is high (50 to 60%) in the Embodiment's Furnace of FIG. 1 but is low (less than 10%) in the conventional furnace of FIG. 10. This shows that in the furnace of FIG. 1, the amount of air entered into the space 71 from the exterior of the furnace is small but in the conventional furnace of FIG. 10, the amount of air entered into the space 27 is large. Secondly, the percentage of carbon dioxide ($CO_2$) is low (less than 5%) in the furnace of FIG. 1 but is high (10 to 40%) in the conventional furnace of FIG. 10. It is evident from this results that in the furnace of FIG. 1, the space 71 above the slag 14 is kept in non-oxidizing atmosphere in a satisfactory manner.

Figure 6:
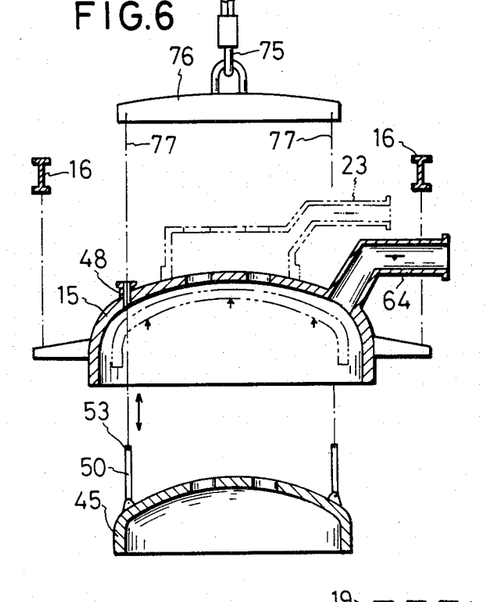
FIG. 6 is a view for explaining the replacement procedure of the inner lid.

According to the aforesaid ladle furnace apparatus, the inner lid 45 is exposed to a high temperature of the molten steel 13 and slag 14 and in addition, it is also exposed to splash of the molten steel 13 and slag 14. As a result, the inner lid 45 is mainly damaged. In this case, the inner lid 45 can be replaced by another new one. The replacement thereof is carried out as follows. Firstly, the electrodes 19 are taken out of the furnace and then, the outer and inner lids 15, 45 are shifted from the ladle 10 to one side thereof. Next, as shown in FIG. 6, a chain 77, the upper end of which is connected to suspension arm 76 suspended by a crane hook 75, is connected to a pin 53 provided at the top end of the rod 50 at the lower end thereof. The inner lid 45 is slightly lifted up as shown in an alternate long and two short dashes line of FIG. 6 to pull out the cotter 51 of the hanging means 47. Thereafter, the crane hook 75 is lowered so that the chain 77 is carried into the cylindrical supporting member 48 of the hanging means 47 to lower the inner lid 45. The inner lid 45 thus lowered may be put on the truck prepared just under the inner lid 45 for replacement thereof. In order to set a new inner lid 45 to the outer lid 15, the reverse of the aforesaid operation is done. The inner lid 45 can be replaced very easily as described above because it has few accessories and connecting members comparative to the outer lid 15.

Figure 7:
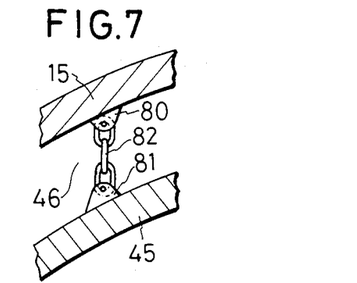
FIG. 7 is a view showing a modification of the connecting means of the outer lid and the inner lid.

Next, referring to FIG. 7, there is shown a modification of the hanging means for hanging the inner lid 45 from the outer lid 15. The hanging means of FIG. 7 comprises hanging lugs 80, 81 attached to the outer lid 15 and the inner lid 45, respectively, and a chain 82 connecting them. In this modification, too, the inner lid 45 is vertically movable in relation to the outer lid 15.

Figure 8:
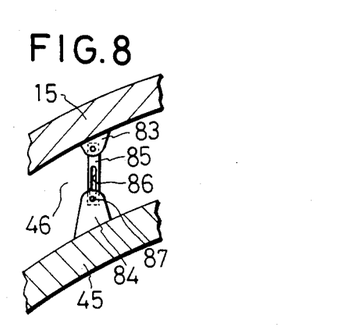
FIG. 8 is a view showing another modification of the connecting means of the outer lid and the inner lid.

Next, referring to FIG. 8, there is another modification of the hanging means. The hanging means of FIG. 8 comprises hanging lugs 83, 84 and a rod 85 connecting them. The rod 85 has a longitudinal elongated hole (long hole) 86 therein and a pin 87 attached to the hanging lug 84 is received into the long hole 86. Therefore, the inner lid 45 is capable of the vertical movement in relation to the outer lid 15 within the extent that the pin 87 can move vertically in the long hole 86.

As a further modification thereof, individual means, which is independently installed to the respective outer and inner lids 15, 45, may be employed to raise and lower the outer and inner lids 15, 45.

Figure 9:
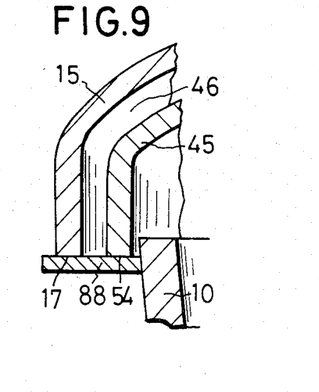
FIG. 9 is a view showing a modification of the constructions of the outer lid receiving surface and the inner lid receiving surface of the ladle.

Next, referring to FIG. 9, there is shown a modification of the structures of outer and inner lid receiving surfaces of the ladle 10. In this modification, a flange 88 is disposed at the outer periphery of the ladle 10, which receives both of the outer and inner lids 15, 45 thereon to close the opening of the ladle 10. Namely, on the upper surface of the flange 88, there are mounted both of the lower end surface 17 of the outer lid 15 and the lower end surface 54 of the inner lid 45. As a further modification thereof, the respective annular lower end surfaces of the outer and inner lids 15, 45 may be mounted on the upper end surface of the ladle 10.

In the present invention, the lower end surface 17 of the outer lid 15 is put on the outer lid receiving surface 12 of the ladle 10. Thus, the quantity of the air flowing through the gap between the lower end surface 17 and the receiving surface 12 into the space 46 between the outer lid 15 and the inner lid 45 is very small when the gas in the space 46 is sucked by the blower as mentioned above. Accordingly, it is sufficient to use a blower of small suction capacity. Moreover, the after-treatment of the sucked gas is simplified due to the small amount of the sucked gas.

In the present invention, further, the quantity of the sucked gas can be limited to a small value as mentioned above even when slag or melted steel is attached to or deposited on the inner lid receiving surface 33 of the ladle 10 and the outer lid receiving surface 12 or even when these receiving surfaces 33, 12 or the lower end surfaces 54, 17 of the inner lid 45 and the outer lid 15 respectively are deformed on account of the high temperature of the slag and melted steel.

Figure 12:
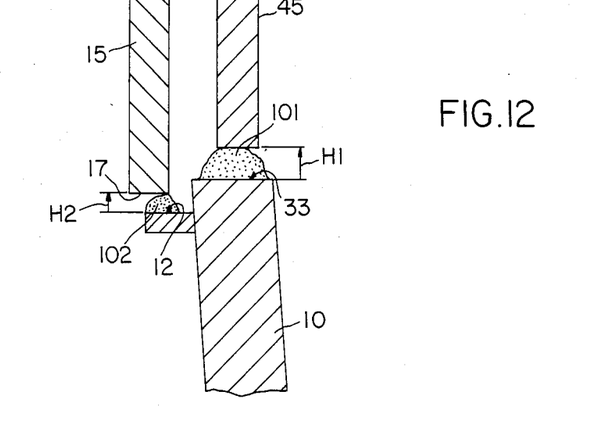

As shown in FIG. 12, the quantity 101 of the slag and melted steel attached to and deposited on the inner lid receiving surface 33 is large since the surface 33 is close to the slag and melted steel inside the ladle 10. On the other hand, the quantity 102 of the slag and melted steel attached to or deposited on the outer lid receiving surface 12 is small since the surface 12 is more remote from the slag and melted steel inside the ladle 10 than the inner lid receiving surface 33. Furthermore, the inner lid receiving surface 33 and the lower end surface 54 of the inner lid 45 are substantially influenced by the high temperature of the slag and melted steel and deformed to a large extent. On the other hand, the outer lid receiving surface 12 and the lower end surface 17 of the outer lid 15 are not as influenced by the high temperature and deformed only to a small extent, since these surfaces are remote from the slag and melted steel and, in addition, are shielded from the high temperature of the slag and melted steel, to a certain degree, by the inner lid 45.

In such a situation, the lower end surface 54 of the inner lid 45 is raised from the inner lid receiving surface 33 (see H1 in FIG. 12) in accordance with the amount 101 of the attached or deposited slag or melted steel and the amount of the deformation, and is brought to a position higher than its original position.

In the ladle furnace according to the present invention however, the inner lid 45 is connected to the outer lid 15 for upward displacement. Thus, the outer lid 15 is raised only slightly (see H2 in FIG. 12) even if the inner lid 45 is raised as mentioned above (see H1 in FIG. 12). The lower end surface 17 of the outer lid 15 is raised by only a small height H2 since a small amount 102 of slag and melted steel is deposited on the outer lid receiving surface 12 which is slightly deformed. As a result of this, the gap between the lower end surface 17 of the outer lid 15 and the receiving surface 12 is kept smaller compared with the gap between the lower end surface 54 of the inner lid 45 and the receiving surface 33 even if the latter gap becomes large. The quantity of the air flowing through the former gap into the space 46 can be kept small. For this reason, the amount of the gas sucked by the blower may be small.

What is claimed is:

1. In a ladle furnace comprising:
  (a) a ladle for accepting molten steel and slag therein, which is provided with an opening at the upper end thereof and an annular outer lid receiving surface at the periphery of said opening;
  (b) an outer lid for closing the opening of said ladle, which is provided with an annular lower end surface at the periphery thereof to be mounted on said outer lid receiving surface of the ladle;
  (c) electrodes extending through electrode holes provided at the outer lid into the interior of said ladle to generate arc between the molten steel accepted into said ladle and the electrodes thereby to heat said molten steel and slag; and
  (d) supplying means for supplying a reducing atmosphere gas to a space within the ladle formed just above the slag and molten steel accepted therein,
  the improvement wherein:
  said ladle further comprises
  (e) an inner lid at the inside of the said outer lid with a predetermined interval so as to form a space therebetween;
  said ladle is further provided with an annular receiving surface for said inner lid at the inside of said outer lid receiving surface;
  said inner lid is provided with an annular lower end surface at the periphery thereof to be mounted on said inner lid receiving surface of said ladle and electrode holes at the central area thereof, through which the electrodes extend into said ladle; and
  said outer lid is provided with a suction port to suck gases entered into the space formed between said outer lid and said inner lid the lower end surface of the outer lid being supported by the outer lid receiving surface, the lower end surface of the inner lid being supported by the inner lid receiving surface, the inner lid being connected, for vertical movement, to the outer lid.

2. A ladle furnace according to claim 1, wherein said inner lid is connected to said outer lid in a vertically movable manner by connecting means.

3. A ladle furnace according to claim 1, wherein said ladle is provided with a flange at the outer periphery thereof and the upper surface of said flange constructs said outer lid receiving surface of said ladle, and the upper end surface of said ladle constructs said inner lid receiving surface.

4. A ladle furnace according to claim 1, wherein said ladle furnace is further equipped with a hood on said outer lid to envelop the electrode holes provided to said outer lid.

* * * * *